United States Patent
Dooley et al.

(10) Patent No.: US 10,443,403 B2
(45) Date of Patent: Oct. 15, 2019

(54) INVESTMENT CASTING CORE

(71) Applicant: General Electric Company, Schenectady, NY (US)

(72) Inventors: Weston Nolan Dooley, West Chester, OH (US); James Michael Hoffman, Hamilton Township, OH (US); Steven Robert Brassfield, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 287 days.

(21) Appl. No.: 15/412,387

(22) Filed: Jan. 23, 2017

(65) Prior Publication Data

US 2018/0209277 A1   Jul. 26, 2018

(51) Int. Cl.
| | |
|---|---|
| *F01D 5/18* | (2006.01) |
| *B22C 9/10* | (2006.01) |
| *B22C 9/24* | (2006.01) |
| *B22C 9/04* | (2006.01) |
| *B22C 7/02* | (2006.01) |
| *B22D 25/06* | (2006.01) |
| *B22D 29/00* | (2006.01) |

(52) U.S. Cl.
CPC ............ *F01D 5/187* (2013.01); *B22C 7/02* (2013.01); *B22C 9/04* (2013.01); *B22C 9/10* (2013.01); *B22C 9/24* (2013.01); *B22D 25/06* (2013.01); *B22D 29/002* (2013.01); *F05D 2220/323* (2013.01); *F05D 2230/211* (2013.01); *F05D 2240/30* (2013.01); *F05D 2250/185* (2013.01); *F05D 2250/241* (2013.01); *F05D 2260/20* (2013.01)

(58) Field of Classification Search
CPC .. F01D 5/187; B22C 7/02; B22C 9/04; B22C 9/10; B22C 9/24; B22D 25/06; B22D 29/002; F05D 2220/323; F05D 2230/211; F05D 2240/30; F05D 2250/185; F05D 2250/241; F05D 2260/20
USPC ...................................... 416/197 R
See application file for complete search history.

(56) References Cited

U.S. PATENT DOCUMENTS

| | | |
|---|---|---|
| 5,947,181 A | 9/1999 | Davis |
| 6,915,840 B2 | 7/2005 | Devine, III et al. |
| 6,966,756 B2 | 11/2005 | McGrath et al. |
| 7,216,694 B2 | 5/2007 | Otero et al. |
| 7,441,585 B2 | 10/2008 | Otero et al. |
| 7,469,739 B2 | 12/2008 | Otero et al. |

(Continued)

FOREIGN PATENT DOCUMENTS

| | | |
|---|---|---|
| CN | 1607052 A | 4/2005 |
| CN | 1745938 A | 3/2006 |

(Continued)

OTHER PUBLICATIONS

Chinese Office Action corresponding to Chinese Application No. 201810063589.8 dated Jun. 5, 2019.

*Primary Examiner* — Mahmoud Gimie
(74) *Attorney, Agent, or Firm* — McGarry Bair PC

(57) ABSTRACT

An apparatus relating to engineering the geometry for a ball-chute support feature in an investment casting core. The investment casting core is for an airfoil region having at least one serpentine feature and at least one inlet feature coupled to the at least one serpentine feature by a ball-chute support feature. The investment casting core is leached out to form cooling passages in the airfoil.

50 Claims, 9 Drawing Sheets

(56) References Cited

U.S. PATENT DOCUMENTS

| | | | | |
|---|---|---|---|---|
| 8,454,301 B1* | 6/2013 | Liang | ............... | F01D 5/081 |
| | | | | 415/116 |
| 2005/0152785 A1* | 7/2005 | McGrath | ............ | F01D 5/187 |
| | | | | 416/97 R |
| 2016/0305252 A1* | 10/2016 | Thornton | ............. | F02C 7/12 |
| 2018/0135429 A1* | 5/2018 | Propheter-Hinckley | ............. | |
| | | | | F01D 5/187 |

FOREIGN PATENT DOCUMENTS

| | | |
|---|---|---|
| CN | 101219461 A | 7/2008 |
| CN | 105873694 A | 8/2016 |
| EP | 0585183 A1 | 3/1994 |
| EP | 2992982 A1 | 3/2016 |
| WO | 2015112268 A2 | 7/2015 |

\* cited by examiner

US 10,443,403 B2

INVESTMENT CASTING CORE

BACKGROUND OF THE INVENTION

Turbine engines, and particularly gas or combustion turbine engines, are rotary engines that extract energy from a flow of combusted gases passing through the engine onto a multitude of rotating turbine blades.

Turbine blade assemblies include the turbine airfoil or blade, a platform and a dovetail mounting portion. The turbine blade assembly includes cooling inlet passages as part of serpentine circuits in the platform and blade used to cool the platform and blade.

Investment casting is utilized to manufacture the serpentine circuits by developing an investment casting core. Fillets between the passages and supporting features of the core can create high stress points and increase the risk of breaking during the investment casting process or during engine operation. It is therefore desirable to develop internal cavity connections with larger fillet radii.

BRIEF DESCRIPTION OF THE INVENTION

In one aspect, the present disclosure relates to an investment casting core for forming a cast airfoil extending between a leading edge and a trailing edge to define chord-wise direction, and extending between a root and a tip to define a span-wise direction, comprising an airfoil region having at least one serpentine feature of the core, a platform region having at least one inlet feature of the core coupled to the at least one serpentine feature of the core, at least one ball-chute support feature of the core extending from the platform region to the airfoil region to define a chute length, which is less than four times the smallest diameter of the ball-chute support feature of the core.

In another aspect, the present disclosure relates to an investment casting core for forming a hollow within a turbine blade assembly having an airfoil extending between a leading edge and a trailing edge to define a chord-wise direction and extending between a root and a tip to define a span-wise direction, comprising an airfoil region with at least one turn defining a serpentine feature of the core, a platform region with a shelf support feature of the core, at least one ball-chute support feature of the core extending between the shelf support feature of the core and the turn.

In yet another aspect, the present disclosure relates to a turbine blade assembly comprising an airfoil extending between a leading edge and a trailing edge to define a chord-wise direction, extending between a root and a tip to define a span-wise direction, and at least one sidewall defining an interior with at least one cooling passage, a dovetail having an inlet passage with a shelf-space, and at least one ball-chute extending between the shelf-space and the at least one cooling passage.

In yet another aspect, the present disclosure relates to a method of casting an airfoil, the method comprising forming an investment casting core with a shelf support feature and at least one ball-chute support extending from the shelf support feature, casting an airfoil having a shelf-space formed from the shelf support feature and a ball-chute formed from the ball-chute support feature.

DETAILED DESCRIPTION OF THE INVENTION

Figure 1:
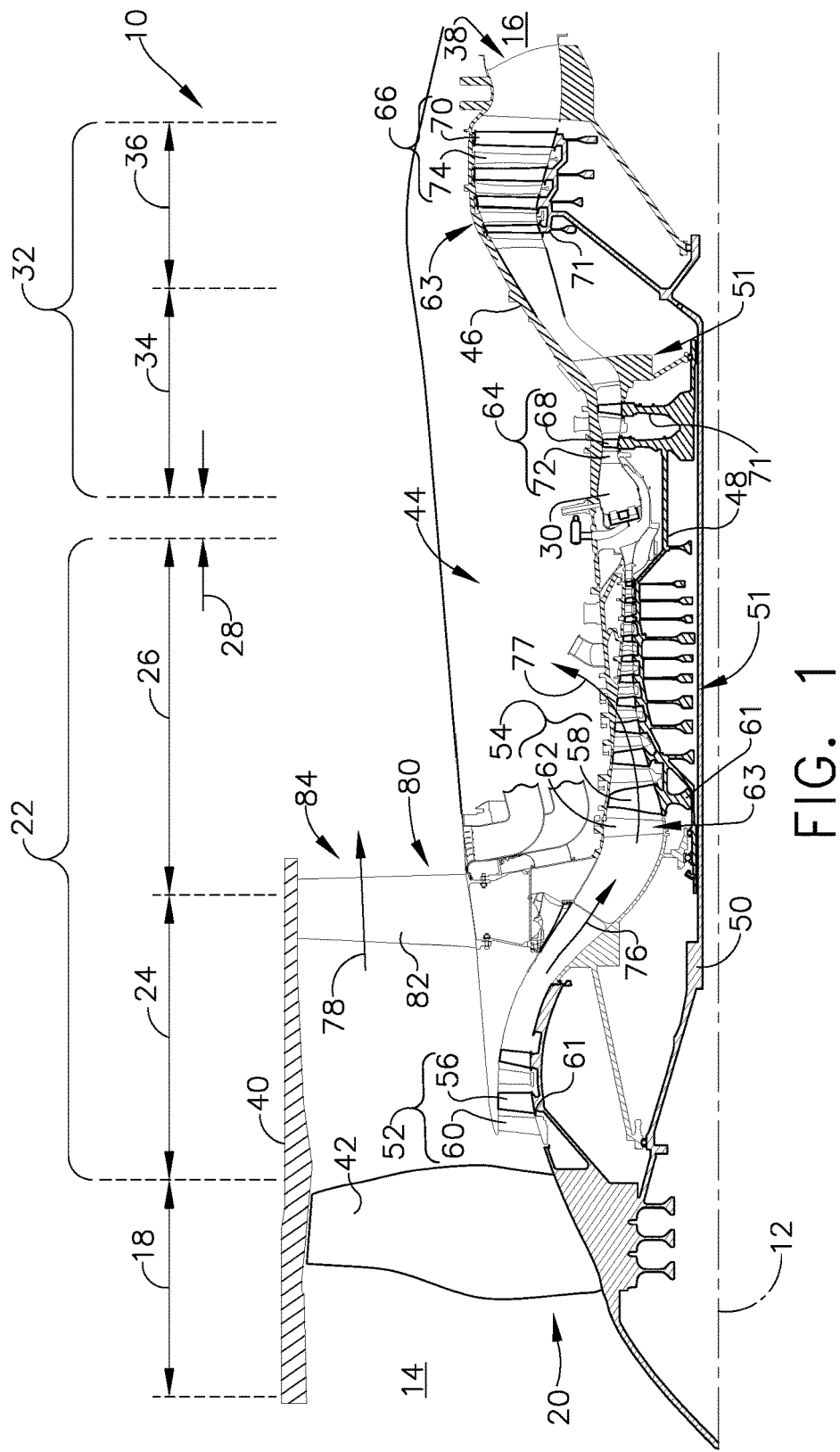
FIG. 1 is a schematic cross-sectional diagram of a gas turbine engine for an aircraft.

Aspects of the disclosure described herein are directed to the geometry of an investment casting core for an investment casting process in the development of serpentine passages as part of a cooling circuit for a turbine blade assembly. For purposes of illustration, the present disclosure will be described with respect to the turbine for an aircraft gas turbine engine. It will be understood, however, that aspects of the disclosure described herein are not so limited and may have general applicability within an engine, including compressors, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component.

Additionally, as used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
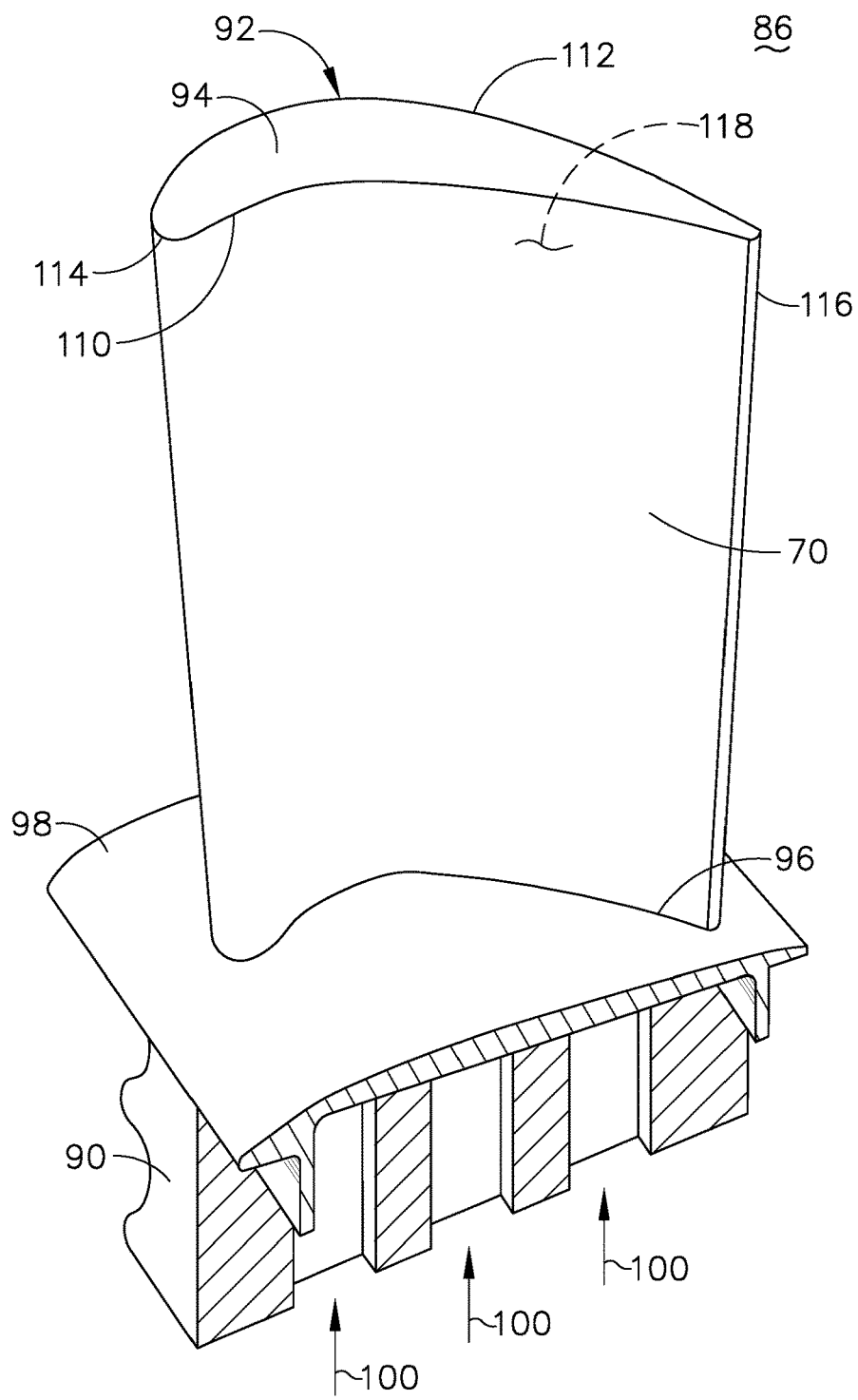
FIG. 2 is a perspective view of a turbine blade assembly for the gas turbine engine of FIG. 1.

FIG. 2 is a perspective view of a turbine blade assembly 86 with an engine component in particular a turbine blade 70 of the engine 10 from FIG. 1. Alternatively, the engine component can include a vane, a shroud, or a combustion liner in non-limiting examples, or any other engine component that can require or utilize cooling passages formed from an investment casting process. The turbine blade assembly 86 includes a dovetail 90 and an airfoil 92. The airfoil 92 extends between a tip 94 and a root 96 to define a span-wise direction. The airfoil 92 mounts to the dovetail 90 on a platform 98 at the root 96. The platform 98 helps to radially contain the turbine engine mainstream air flow. The dovetail 90 can be configured to mount to the turbine rotor disk 71 on the engine 10. The dovetail 90 further includes at least one inlet passage 100, exemplarily shown as three inlet passages 100, each extending through the dovetail 90 to provide internal fluid communication with the airfoil 92. It should be appreciated that the dovetail 90 is shown in cross-section, such that the inlet passages 100 are housed within the body of the dovetail 90.

The airfoil 92 includes a concave-shaped pressure sidewall 110 and a convex-shaped suction sidewall 112 which are joined together to define an airfoil shape extending between a leading edge 114 and a trailing edge 116 to define a chord-wise direction. The airfoil 92 has an interior 118 defined by the sidewalls 110, 112. FIGS. 1 and 2 illustrate an environment in which the disclosure described herein is applicable. The airfoil 92 of FIG. 2 as an exemplary airfoil that can be made with an investment casting process.

Figure 3:
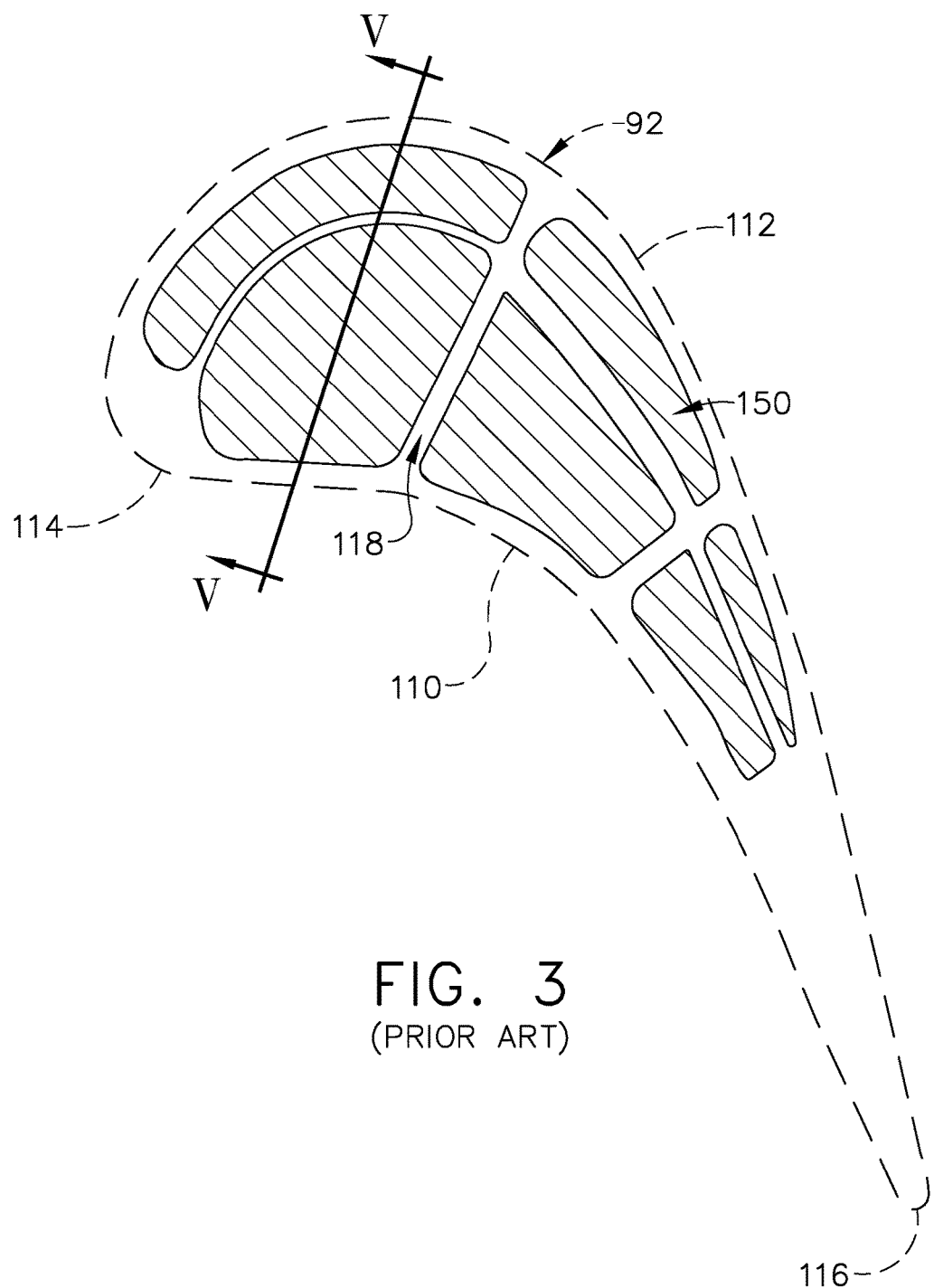
FIG. 3 is a top cross-section view of an investment casting core for the turbine blade assembly of FIG. 2 from the prior art.

Referring to FIG. 3, an investment casting core 150 known in the prior art is illustrated, which is used to make internal passages of the airfoil 92. The investment casting core 150 is located within the interior 118 of the airfoil 92, which is shown in dashed lines for clarity of the investment casting core 150. During the investment casting process, one or more molds enclose the investment casting core 150 to define voids between the molds and the investment casting core. Molten material, such as a metal alloy, is then introduced into the voids and cooled to form the cast airfoil 92. The investment casting core is then removed, such as by leaching, leaving a hollow portion where the investment casting core 150 was. Thus, the investment casting core 150 is a solid representation of the internal passages 172 that will be present in the airfoil 92 upon completion.

Figure 4:
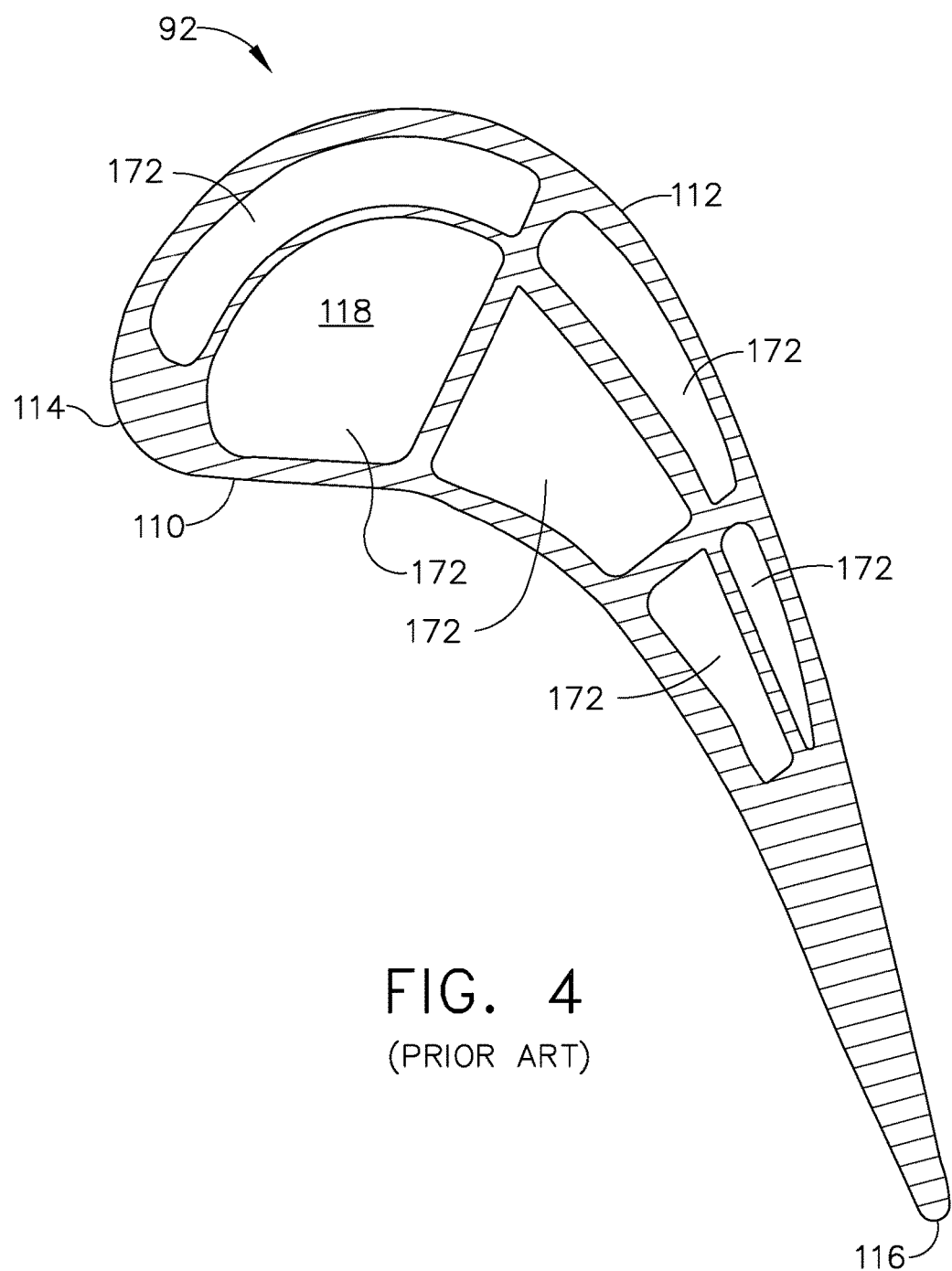
FIG. 4 is a top cross-section view of an airfoil with cooling passages for the turbine blade assembly of FIG. 2 from the prior art.

Turning to FIG. 4, more specifically, the investment casting core 150 forms cooling passages 172 in the airfoil 92 that are in fluid communication with the inlet passages 100 of FIG. 2. While illustrated as forming six cooling passages, it should be appreciated that more or less cooling passages can also be contemplated. The cooling passages can vary in shape and size as well as orientation.

Figure 5:
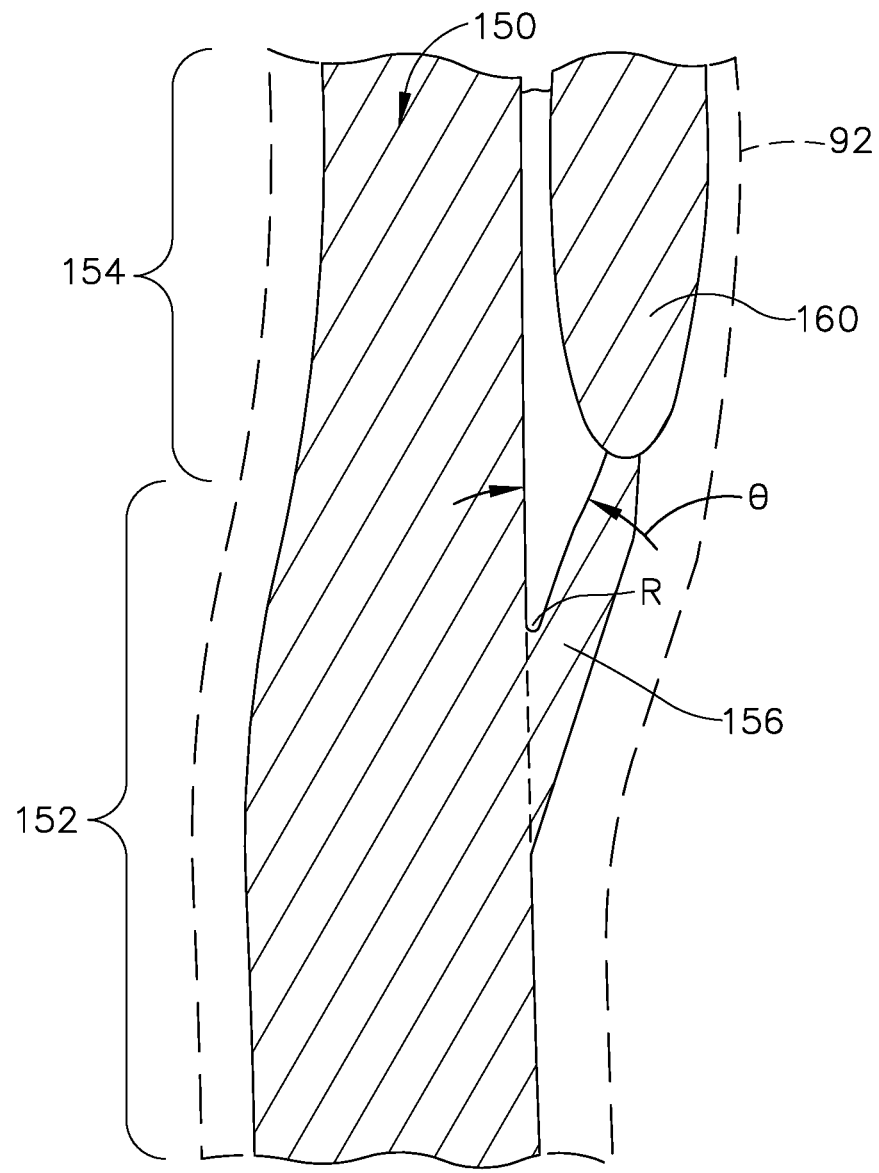
FIG. 5 is a side cross-section view of an investment casting core for the turbine blade assembly of FIG. 3 from the prior art.

FIG. 5 is a cross-section of the airfoil 92 taken along line V-V of FIG. 3. The investment casting core 150 includes a main region 152 and a secondary region 154 with a support feature 156 extending between the main region 152 and the secondary region 154. The main region 152 generally refers to features below the platform 98, while the secondary region 154 generally refers to all features within the airfoil 92. The support feature 156 extends from the main region 152 typically at an acute angle θ forming a local fillet radius R less than 0.0050 in (0.013 cm). The investment casting core 150 is formed from ceramic.

Ceramic is a brittle material such that small core features 160 can require support throughout the investment casting process. During the investment casting process the support features 156 provide support to the small core features 160 within the secondary region 154. Small fillet radii R can create sharp brittle edges in the investment casting core 150 and in some cases cause breakage during processing. Upon completion when the investment casting core 150 is leached out to form the cooling passages 172 high stress concentration points can be formed in the airfoil metal alloy portion where the small fillet radii R were located in the investment casting core 150.

Figure 6:
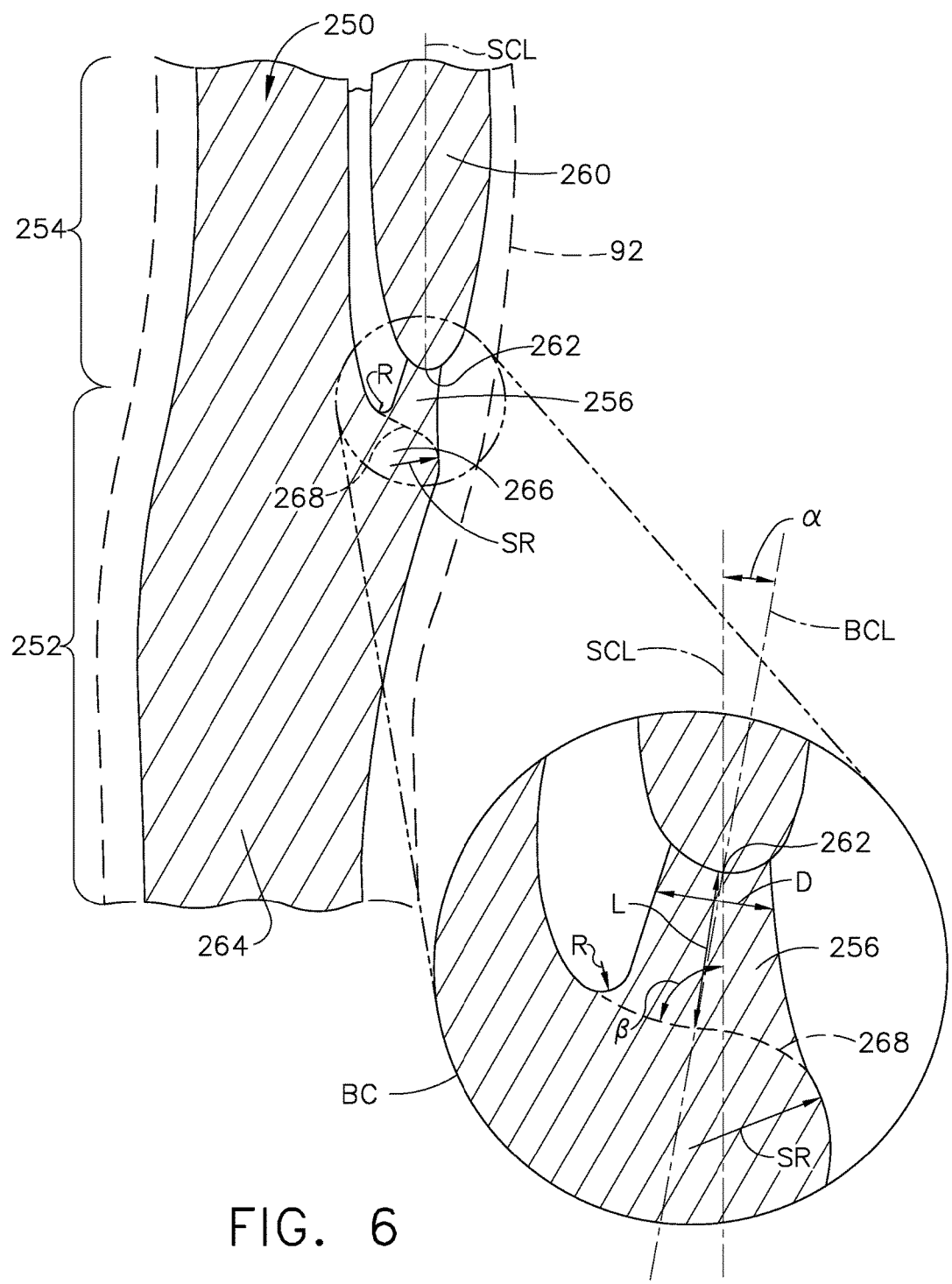
FIG. 6 is a side cross-section view of an investment casting core for the turbine blade assembly of FIG. 2 according to aspects of the disclosure described herein.

An investment casting core 250 according to aspects of the disclosure described herein is illustrated in FIG. 6. The investment casting core 250 can be implemented in the exemplary airfoil 92. The investment casting core 250 includes a platform region 252 and an airfoil region 254 with a ball-chute support feature 256 extending between the platform region 252 and the airfoil region 254. The airfoil region 254 is any part of the investment casting core 250 used to form cooling passages 272 (FIG. 7) in the airfoil 92 during an investment casting process. At least a portion of at least one serpentine feature 260 is formed in the airfoil region 254. The serpentine feature 260 defines a serpentine core centerline SCL. The serpentine feature 260 can include at least one turn 262.

The platform region 252 of the investment casting core 250 is any feature below the airfoil section 254 or any feature below the platform 98. At least one inlet feature 264 is formed in the platform region 252. At least one inlet feature 264 can expand to include a shelf support feature 266. The shelf support feature 266 is formed where the airfoil region 254 meets the platform region 252. The shelf support feature 266 provides a base from which the ball-chute support feature 256 can extend. The shelf support feature 266 can extend chord-wise or circumferentially, in the direction in which the airfoil 92 rotates, away from the inlet feature 264 with a local radius SR where the ball-chute support feature 256 meets the shelf support feature 266.

An enlarged view of the ball-chute support feature 256 is depicted in the call out BC. The ball-chute support feature 256 extends and meets the serpentine feature 260 at the turn 262. The ball-chute support feature 256 defines a centerline body-axis BCL along which a chute length L extending from the turn 262 to the shelf support feature 266 can be measured. An angle α formed between the centerline body-axis BCL and the serpentine core centerline SCL can range from −45° to 45°. An angle β formed between an edge 268 of the shelf support feature 266 and the centerline body-axis BCL can range from 45° to 135°. It should be understood that the angle and orientation of the ball-chute support feature 256 can be in any direction, for example but not limited to an axial direction or a radial direction, such that it supports the serpentine feature 260 and that the angles disclosed herein are exemplary and not meant to be limiting.

A diameter D is measured at the smallest diameter of the ball-chute support feature 256. The radius SR is preferably 0.02 in (0.05 cm) or greater than half the diameter D of the ball-chute support feature 256. The chute length L is preferably less than two times the diameter D of the ball-chute support feature 256. It is contemplated that the chute length L can be as great as four times the diameter D. A local fillet radius R between the shelf support feature 266 and the ball-chute support feature 256 is formed such that the local fillet radius R is greater than 0.02 in (0.05 cm) or greater than half the diameter D.

The investment casting core can be formed from ceramic and is therefore relatively weak and brittle during the investment casting process. The ball-chute support feature 256 provides required support to the serpentine feature 260 at the at least one turn 262 to maintain its form and shape during the casting process. Forming fillets with radii R greater than half the diameter D is desirable during the investment casting process to prevent breakage as already described herein. Additionally when metal alloy is poured around the investment casting core, larger fillet radii R in the investment casting core 250 provide for smooth transition and turns in the resulting cooling passages 172. It should also be noted that decreasing the chute length L of the ball-chute core 256 also minimizes the amount of metal alloy used in forming the airfoil 92 and therefore decreases the overall weight of the airfoil 92.

Figure 7:
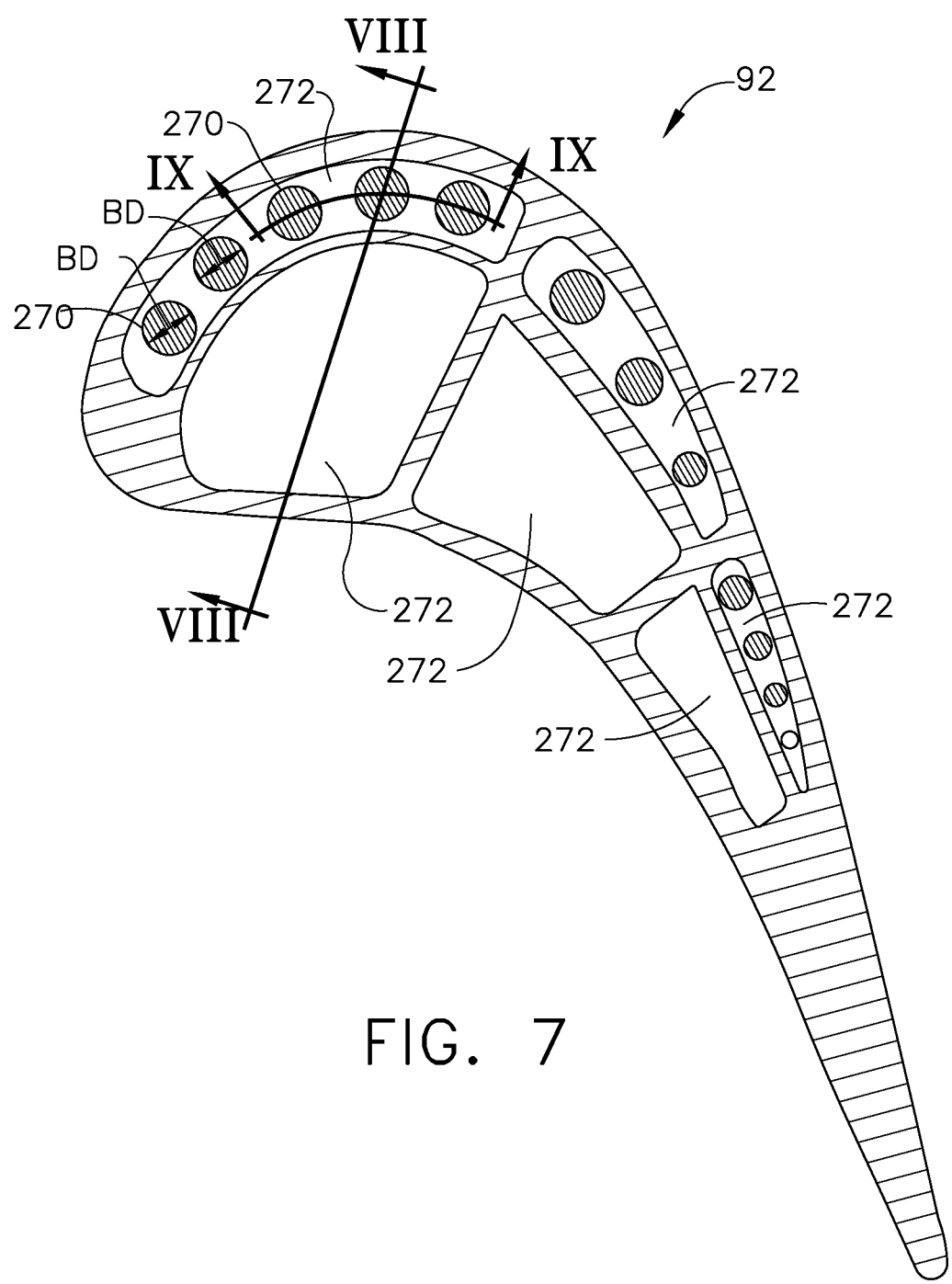
FIG. 7 is a top cross-section view of an airfoil for the turbine blade assembly of FIG. 2 according to aspects of the disclosure described herein.

FIG. 7 illustrates inlet cooling passages 272 formed by the inlet feature of the core 264. The resulting airfoil 92 and cooling passages 272 are illustrated. While six cooling passages 272 are illustrated, it is contemplated that more or less cooling passages can be formed by the investment casting core 250. At least one ball 270 is provided within a portion of the at least one cooling passage 272. The at least one ball 270 defines a ball diameter BD. By way of non-limiting example, a ball diameter BD can range from 0.04 to 0.12 in (0.1 to 0.3 cm). The at least one ball 270 is sized to block air from traveling through a portion of the cooling passages 272.

Figure 8:
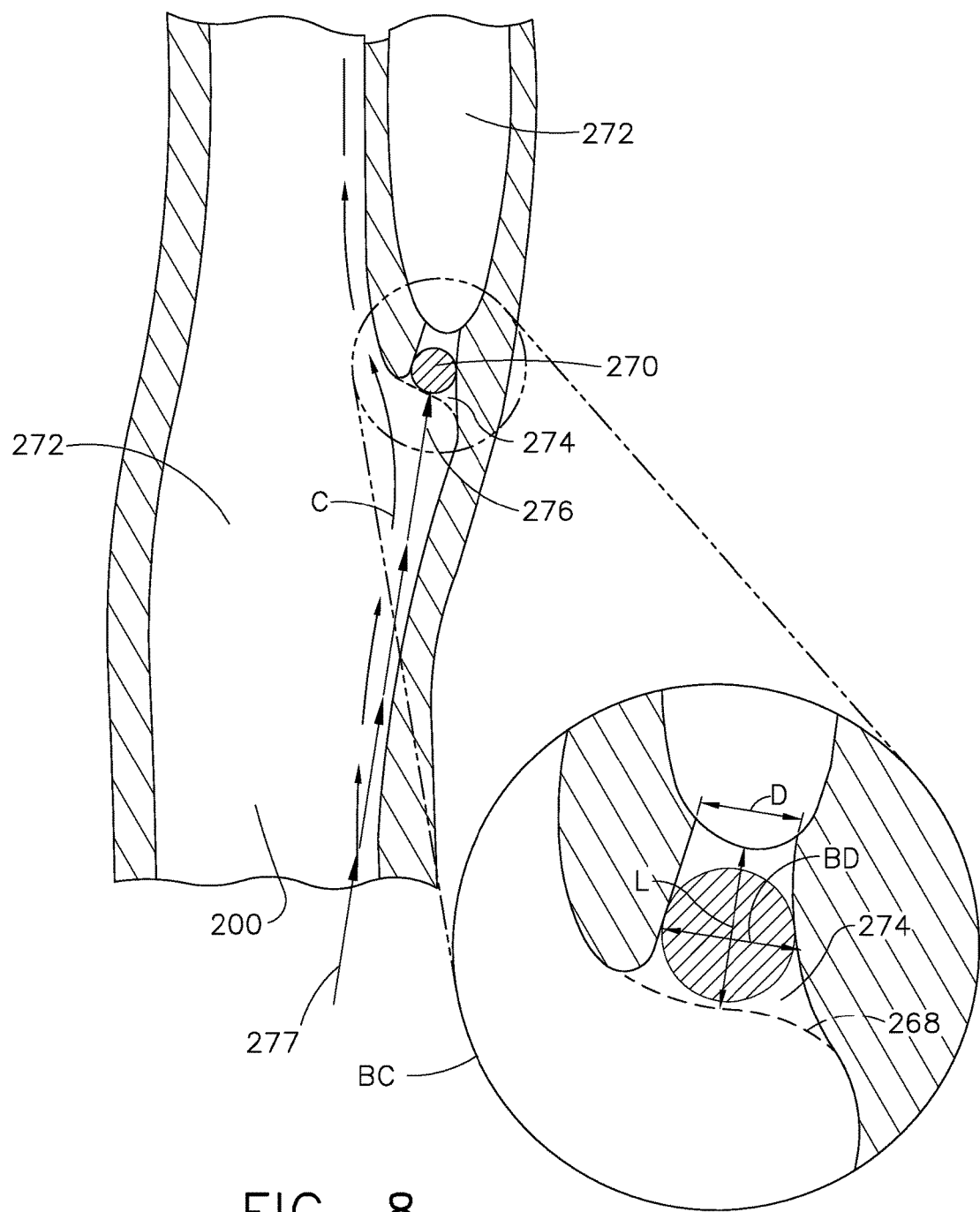
FIG. 8 is a side cross-section view of the airfoil from FIG. 7 according to aspects of the disclosure described herein.

FIG. 8 is a cross-section taken along line VIII-VIII of FIG. 7. A ball-chute 274 formed by the ball-chute support feature of the core 256 holds the at least one ball 270 to block and redirect cooling air C within the cooling passages 272. It should be understood that the ball diameter BD is formed to be received in the smallest diameter D of the ball-chute 274. Therefore, the chute length L of the ball-chute support feature of the core 256 and therefore the ball-chute 274 is less than 0.5 in (1.2 cm) and preferably less than 0.3 in (0.8) cm. The local fillet radius R is therefore greater than 0.02 in (0.05 cm) or greater than half the ball-diameter BD.

Shelf-space 276 formed by the shelf support feature of the core 266 provides smooth transitions and turns for the cooling passages 272 in particular an inlet cooling passage 200 formed by the inlet feature of the core 264. Additionally, the chute length L of the ball-chute 274 minimizes areas where stagnation in flow can occur when compared to the support section 156 in the prior art (FIG. 5). The shelf-space 276 also creates a line-of-sight 277 for installation of each ball 270.

Figure 9:
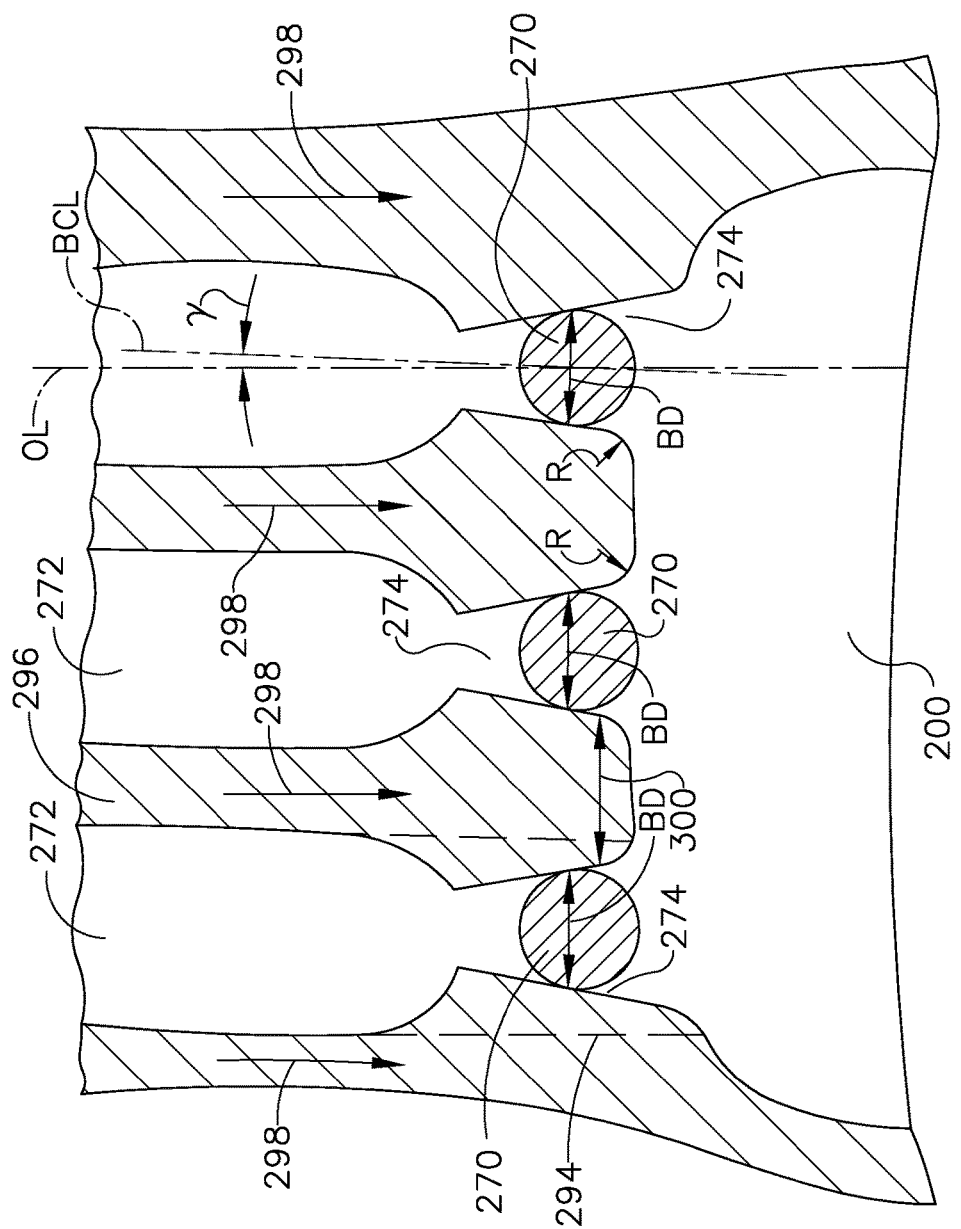
FIG. 9 is a front cross-section view of the airfoil from FIG. 7 according to aspects of the disclosure described herein.

Another cross-section along line IX-IX of FIG. 7 is illustrated in FIG. 9. It is contemplated that multiple ball-chutes 274 can extend from the shelf-space 276 to multiple cooling passages 272 in the airfoil section 254. An angle γ formed between the centerline body-axis BCL and an orthogonal line OL as measured from the direction of rotation of the airfoil 92 is between −30 and 30°. In this manner, the orientation of the centerline body-axis BCL can fluctuate chord-wise, span-wise, circumferentially and any combination thereof with respect to the turbine blade assembly 86.

Each ball-chute 274 is oriented such that during the investment casting process the serpentine feature 260 is aligned, illustrated with dashed lines 294, above the ball-chute support feature 256. After the airfoil 92 is cast, ribs 296 separating the cooling passages 272 carry loads within the metal alloy of the airfoil 92 during engine operation. Aligning 294 the ball-chute support feature 256 with the serpentine feature 260 confines load paths 298 to the ribs 296 and enables shielding of the ball-chute 274 from the load paths 298.

Each ball-chute 274 is spaced 300 to control the amount of metal alloy between the ball-chutes 274. The metal alloy is distributed such that the load paths 298 are uniformly spread out within the airfoil 92.

It should be appreciated that the investment casting core 150 and the turbine blade assembly 86 with the passages 100, 172 formed by the investment casting core 150 can both define similar features. By way of non-limiting example, the serpentine feature 260 defines the serpentine core centerline SCL in the same way that the serpentine cooling passage 272 defines a serpentine centerline. In essence the serpentine core centerline SCL and the serpentine centerline are the same line.

A method of casting the airfoil 92 includes forming the investment casting core 150 with a shelf support feature 266 and at least one ball-chute support feature 256 extending from the shelf support feature 266 to the serpentine feature 260. Then casting the airfoil 92 to include the shelf-space 276 formed from the shelf support feature 266 and the ball-chute 274 formed from the ball-chute support feature 256. Further aspects of the method of casting the airfoil 92 are previously described herein.

Aspects of the disclosure described herein relate to engineering the geometry for ball-chute support features of the cores that provide support to the serpentine and inlet features of the cores used in an investment casting process. The ball-chute support feature of the core provides strength and stiffness during the casting process. Benefits associated with the geometry include a reduction in the operational mechanical and thermal stresses in the area of the ball-chute support feature of the core due to the comparatively larger fillet radii and forming a shelf in the inlet feature of the core to keep high stress areas out of the load path.

An altered internal cavity structure including the shelf upon which the ball-chute support feature of the core can rest provides a larger fillet interface between the shelf and ball-chute when compared to a typical turbine blade design where the ball-chute is commonly found at an acute angle to the inlet feature of the core resulting in sharp fillets, or small fillet radii, between the two features. By adjusting the topology of the internal cavity structure to provide a less acute angle between the two features a larger effective local fillet radius is obtained. Designing both the cavity structure and ball-chute together as a system yields a more balanced design for stress, weight, and manufacturing.

Technical advantages associated with investment casting core described herein include stress reduction during engine operation while maintaining strength and stiffness during investment casting which results in commercial advantages of durability due to the stress reduction. Additionally, the addition of a shelf aspect to the inlet feature of the core results in less metal used in the final turbine blade assembly, which is an overall weight reduction. The shelf-space also creates a line-of-site allowing installation of the balls into the ball-chutes without implementing robotics or other mechanical installation techniques.

It should be appreciated that application of the disclosed design is not limited to turbine engines with fan and booster sections, but is applicable to turbojets and turbo engines as well.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An investment casting core for forming a cast airfoil extending between a leading edge and a trailing edge to define chord-wise direction, and extending between a root and a tip to define a span-wise direction, comprising:
    an airfoil region having at least one serpentine feature;
    a platform region having at least one inlet feature coupled to the at least one serpentine feature;
    at least one ball-chute support feature extending from the platform region to the airfoil region to define a chute length, which is less than four times the smallest diameter of the ball-chute support feature; and
    a fillet between the inlet feature and the ball-chute support feature.

2. The investment casting core of claim 1 wherein the chute length is less than two times the smallest diameter of the ball-chute support feature.

3. The investment casting core of claim 1 wherein the fillet defines a local radius greater than 0.02 in (0.05 cm).

4. The investment casting core of claim 1 wherein the at least one ball-chute support feature comprises multiple ball-chute support features.

5. The investment casting core of claim 4 wherein the multiple ball-chute support features are spaced to control a load path in the cast airfoil.

6. The investment casting core of claim 1 wherein the at least one ball-chute support feature defines a centerline body-axis.

7. The investment casting core of claim 6 wherein the centerline body-axis is oriented in the chord-wise direction.

8. The investment casting core of claim 6 wherein the centerline body-axis is oriented in the span-wise direction.

9. The investment casting core of claim 6 wherein the airfoil rotates in a direction to define a circumferential direction and the centerline body-axis is oriented in the circumferential direction.

10. The investment casting core of claim 6 where the serpentine feature defines a serpentine core centerline and an angle formed between the centerline body-axis and the serpentine core centerline ranges from −45° to 45°.

11. The investment casting core of claim 6 wherein the platform region comprises a shelf support feature having an edge and the centerline body-axis forms an angle with the edge between 45° and 135°.

12. The investment casting core of claim 1 wherein the investment casting core is ceramic.

13. The investment casting core of claim 1 wherein the ball-chute support feature is aligned below the at least one serpentine feature.

14. An investment casting core for forming a hollow within a turbine blade assembly having an airfoil extending between a leading edge and a trailing edge to define a chord-wise direction and extending between a root and a tip to define a span-wise direction, comprising:
   an airfoil region with multiple turns defining a serpentine feature;
   a platform region with a shelf support feature;
   multiple ball-chute support features, each extending between the shelf support feature and a corresponding turn.

15. The investment casting core of claim 14 wherein the multiple ball-chute support features each define a chute length, which is less than four times the smallest diameter of the ball-chute support feature.

16. The investment casting core of claim 14 wherein the multiple ball-chute support features each define a chute length, which is less than two times the smallest diameter of the ball-chute support feature.

17. The investment casting core of claim 14 further including a fillet between the shelf support feature and the ball-chute support feature.

18. The investment casting core of claim 17 wherein the fillet defines a local radius greater than 0.02 in (0.05 cm).

19. The investment casting core of claim 14 wherein the turbine blade assembly further comprises an airfoil region.

20. The investment casting core of claim 19 wherein at least a portion of the serpentine feature is provided in the airfoil region.

21. The investment casting core of claim 14 wherein the multiple ball-chute support features are spaced to control a load path in the airfoil.

22. The investment casting core of claim 14 wherein the multiple ball-chute support features define a centerline body-axis.

23. The investment casting core of claim 22 wherein the centerline body-axis is oriented in the chord-wise direction.

24. The investment casting core of claim 22 wherein the centerline body-axis is oriented in the span-wise direction.

25. The investment casting core of claim 22 wherein the airfoil rotates in a direction to define a circumferential direction and the centerline body-axis is oriented in the circumferential direction.

26. The investment casting core of claim 22 wherein the shelf support feature defines an edge and the centerline body-axis forms an angle with the edge between 45° and 135°.

27. The investment casting core of claim 22 where the serpentine feature defines a serpentine core centerline and an angle formed between the centerline body-axis and the serpentine core centerline ranges from −45° to 45°.

28. The investment casting core of claim 14 wherein the ball-chute support feature is aligned below the serpentine feature.

29. The investment casting core of claim 14 wherein the investment casting core is ceramic.

30. The investment casting core of claim 14 wherein the investment casting core is leeched out to form a cooling circuit in the turbine blade assembly.

31. A turbine blade assembly comprising:
   an airfoil extending between a leading edge and a trailing edge to define a chord-wise direction, extending between a root and a tip to define a span-wise direction, and at least one sidewall defining an interior with at least one cooling passage;
   a dovetail having an inlet passage with a shelf-space;
   at least one ball-chute extending between the shelf-space and the at least one cooling passage; and
   a fillet between the shelf-space and the at least one ball-chute.

32. The turbine blade assembly of claim 31 wherein the at least one ball-chute defines a chute length, which is less than four times the smallest diameter of the ball-chute.

33. The turbine blade assembly of claim 31 wherein the at least one ball-chute defines a chute length, which is less than two times the smallest diameter of the ball-chute.

34. The turbine blade assembly of claim 31 wherein the fillet defines a local radius greater than 0.02 in (0.05 cm).

35. The turbine blade assembly of claim 31 wherein the at least one ball-chute is multiple ball-chutes.

36. The turbine blade assembly of claim 35 wherein the multiple ball-chutes are spaced to control a load path in the turbine blade assembly.

37. The turbine blade assembly of claim 31 wherein the at least one ball-chute defines a centerline body-axis.

38. The turbine blade assembly of claim 37 wherein the centerline body-axis is oriented in the chord-wise direction.

39. The turbine blade assembly of claim 37 wherein the centerline body-axis is oriented in the span-wise direction.

40. The turbine blade assembly of claim 37 wherein the airfoil rotates in a direction to define a circumferential direction and the centerline body-axis is oriented in the circumferential direction.

41. The turbine blade assembly of claim 37 wherein the shelf-space defines an edge and the centerline body-axis forms an angle with the edge between 45° and 135°.

42. The turbine blade assembly of claim 41 where the at least one cooling passage is a serpentine cooling passage.

43. The turbine blade assembly of claim 42 where the serpentine cooling passage defines a serpentine centerline and an angle formed between the centerline body-axis and the serpentine centerline ranges from −45° to 45°.

44. The turbine blade assembly of claim 42 wherein the ball-chute is aligned below the serpentine cooling passage.

45. A method of casting an airfoil, the method comprising:
   forming an investment casting core with a shelf support feature and at least one ball-chute support defining a centerline body-axis and extending from the shelf support feature with a fillet interface between the shelf support feature and the at least one ball-chute support feature;
   casting an airfoil having a shelf-space formed from the shelf support feature, a ball-chute formed from the ball-chute support feature, and a fillet formed from the fillet interface defining a local fillet radius of greater than 0.02 inches.

46. The method of claim 45 wherein the forming an investment casting core further includes forming a ball-chute support feature with a chute length, which is less than two times the smallest diameter of the ball-chute support feature.

47. The method of claim 45 wherein the forming an investment casting core further includes forming the investment casting core from a leachable material.

48. The method of claim 47 wherein the casting an airfoil further includes removing the leachable material.

49. The method of claim 47 wherein the forming an investment casting core further includes forming multiple ball-chute support features.

50. The method of claim 47 wherein the forming an investment casting core further includes forming the shelf support feature with an edge having an angle between 45° and 135° with the centerline body-axis.

* * * * *